(12) United States Patent
Tarassov

(10) Patent No.: US 7,827,549 B2
(45) Date of Patent: Nov. 2, 2010

(54) METHOD AND SYSTEM FOR CREATING AND EXECUTING GENERIC SOFTWARE PACKAGES

(75) Inventor: Andrei Tarassov, Estonia (GB)

(73) Assignee: Symantec Corporation, Mountain View, CA (US)

( * ) Notice: Subject to any disclaimer, the term of this patent is extended or adjusted under 35 U.S.C. 154(b) by 1083 days.

(21) Appl. No.: 11/532,425

(22) Filed: Sep. 15, 2006

(65) Prior Publication Data
US 2008/0127171 A1 May 29, 2008

(51) Int. Cl.
*G06F 9/445* (2006.01)
*G06F 9/45* (2006.01)

(52) U.S. Cl. ............... 717/174; 717/177; 717/147

(58) Field of Classification Search ............. 717/177, 717/147
See application file for complete search history.

(56) References Cited

U.S. PATENT DOCUMENTS

| | | | |
|---|---|---|---|
| 5,835,777 A * | 11/1998 | Staelin | 717/175 |
| 6,063,134 A * | 5/2000 | Peters et al. | 717/176 |
| 6,117,187 A * | 9/2000 | Staelin | 717/169 |
| 6,675,382 B1 * | 1/2004 | Foster | 717/177 |
| 7,150,014 B2 * | 12/2006 | Graupner et al. | 717/174 |
| 7,266,817 B1 * | 9/2007 | Barrett | 717/174 |
| 7,346,904 B2 * | 3/2008 | Fisher et al. | 717/177 |
| 7,634,771 B2 * | 12/2009 | Benjes et al. | 717/174 |
| 2003/0163807 A1 * | 8/2003 | Drake et al. | 717/174 |
| 2003/0233490 A1 * | 12/2003 | Blaser et al. | 709/328 |
| 2004/0060035 A1 * | 3/2004 | Ustaris | 717/100 |
| 2005/0055692 A1 * | 3/2005 | Lupini et al. | 717/174 |

OTHER PUBLICATIONS

BitRock builder tool, "http://www.birtrock.com/products_installbuilder_features.html" (Jan. 25, 2007).
Linux.com, The Enterprise Linux Resource, http://www.linux.com (Jan. 25, 2007).

* cited by examiner

*Primary Examiner*—Thomas K Pham
(74) *Attorney, Agent, or Firm*—Advantedge Law Group

(57) ABSTRACT

Exemplary methods and systems for creating and executing generic software packages are disclosed. A method for creating generic software packages may include receiving a digital file, providing meta-data that indicates a feature of the digital file, and providing a determination module adapted to identify a target platform where the digital file is to be installed. The method may also include providing a configuration module adapted to configure the meta-data to be compatible with the target platform and including the determination module and the configuration module in the generic software package such that the generic software package includes the digital file, the meta-data, the determination module, and the configuration module. An exemplary method for executing generic software package may include providing the generic software package, identifying a target platform where the digital file is to be installed, and configuring meta-data to be compatible with the target platform.

21 Claims, 11 Drawing Sheets

METHOD AND SYSTEM FOR CREATING AND EXECUTING GENERIC SOFTWARE PACKAGES

Software vendors often use software packages to distribute software programs for LINUX, UNIX, and various other operating systems. Such operating systems may include or be configured with package management systems that install, uninstall, update, organize, and maintain the software programs or other files provided in software packages. Package management systems typically work with only one software package format. For example, RED HAT PACKAGE MANAGER (RPM) is configured to work with software packages in the LINUX standard base format, but is not compatible with SOLARIS software packages (i.e., software packages in the SysV format). A software package that is formatted to work with a particular package management system is commonly referred to as being "native" to that particular package management system. For example, a LINUX standard base software package is a native software package with respect to RPM. In addition, since RPM is configured to work with RED HAT LINUX, RPM is considered to be a native software management system for RED HAT LINUX. Thus, a LINUX STANDARD BASE software package may be considered as being native to the RED HAT LINUX operating system.

Software vendors often distribute platform independent software compatible with multiple operating systems; however, since conventional software packages are operating system and package management system dependent, these conventional software packages are unusable unless they are native to the target operating system and package management system. Therefore, a typical software package is only compatible with a relatively limited number of systems.

Software vendors desiring to offer their software to the largest possible number of consumers must create native software packages for each operating system they wish to support. This process is inefficient for many reasons. Vendors are compelled to make and distribute multiple software packages for the same software program. In addition, because consumers must search for software packages compatible with their operating system and package management system, such consumers may not be able to find a compatible software package for a software program they desire to use. Furthermore, consumers may acquire a software package only to find that it is incompatible with their system. In these situations, consumers are left to attempt to reconfigure the software package or do without the software program.

Attempts to address the issue of software package incompatibility fall short of solving the problem. For example, a program known as "ALIEN" allows a user to convert one type of LINUX package to another type of LINUX package. However, ALIEN is limited in use because it only converts between different types of LINUX packages. Furthermore, tools like ALIEN require consumers to install additional software, learn how to use the additional software, and then spend the extra time running the software to convert software packages to a format compatible with their system.

Software package incompatibility also makes software deployment more difficult. When a software package is deployed to computers using different operating systems, the Information Technology (IT) personnel controlling the distribution may face additional complexities and challenges in getting the software to function properly on the target computers. These challenges can waste the time of IT personnel and reduce end-user productivity.

SUMMARY

Various embodiments comprise a computer-implemented method for creating a generic software package. The method may comprise receiving a digital file, providing meta-data that indicates a feature of the digital file, and providing a determination module adapted to identify a target platform where the digital file is to be installed. The method may also comprise providing a configuration module adapted to configure the meta-data to be compatible with the target platform and including the determination module and the configuration module in the generic software package such that the generic software package comprises the digital file, the meta-data, the determination module, and the configuration module.

In certain embodiments, the method for creating a generic software package comprises receiving a description of the digital file and transforming the description into the meta-data. In some embodiments, the method comprises receiving an indication of at least one desired target platform and including the indication of the at least one platform in the generic software package. The determination module may be adapted to select the target platform from the plurality of platforms. In additional embodiments, the determination module is adapted to automatically identify the target platform.

According to at least one embodiment, the method for creating a generic software package comprises receiving a native software package. The native software package may comprise the digital file and the meta-data. Receiving the native software package may comprise receiving the digital file, and receiving the native software package may comprise providing the meta-data. Furthermore, the native software package may be native to a non-target platform. The method may also include transforming the native software package into the generic software package by including the determination module and the configuration module in the native software package. Including the determination module and the configuration module in the generic software package may comprise including the platform determination module and the configuration module in the native software package. The method may comprise transforming the meta-data to be compatible with the configuration module. In some embodiments, the method may comprise copying the digital file from the native software package to the generic software package.

According to certain embodiments, the method for creating a generic software package comprises including an installation module in the generic software package. In some embodiments, the target platform is an operating system. And in at least one embodiment, the feature of the digital file is at least one of a characteristic of the digital file and an operation to be performed on the digital file. Furthermore, the configuration module may be adapted to create a native software package that is native to the target platform. According to certain embodiments, the configuration module may also be adapted to configure the meta-data to be compatible with the target platform by transforming the meta-data for compatibility with the target platform.

Various embodiments comprise a system for creating a software package. The system comprises a first input adapted to receive a digital file, a second input adapted to receive an indication of a feature of the digital file, and a storage medium adapted to store a determination module and a configuration module. The determination module may be adapted to identify a target platform where the digital file is to be installed, and the configuration module may be adapted to configure the indication of the feature of the digital file to be meta-data compatible with the target platform. The system also comprises a processor coupled to the storage medium and the first and second inputs. The processor may be adapted to include the determination module and the configuration module in the generic software package such that the generic software package comprises the digital file, the meta-data, the determination module, and the configuration module.

In certain embodiments, the system for creating a software package comprises a third input adapted to receive an indication of at least one desired target platform. The system may also comprise a second processor adapted to include the indication of at least one desired target platform in the software package, wherein the configuration module is adapted to select the target platform from the at least one desired target platform. The system may further comprise a fourth input adapted to receive a native software package. In addition, the native software package may comprise the digital file and the meta-data.

In at least one embodiment, the system for creating a software package comprises a third processor configured to transform the native software package into the generic software package by including the determination module and the configuration module in the native software package. In some embodiments, a single processor may comprise the first, second, and third processors. Similarly, a single input may comprise the first, second, third, and fourth inputs.

Various embodiments include a computer readable medium comprising instructions executable on a processor. These instructions may be operable to implement receiving a digital file, providing meta-data that indicates a feature of the digital file, and providing a determination module adapted to identify a target platform where the digital file is to be installed. The instructions may also be operable to implement providing a configuration module adapted to configure the meta-data to be compatible with the target platform and including the determination module and the configuration module in a generic software package such that the generic software package comprises the digital file, the meta-data, the determination module, and the configuration module. The computer readable medium may be at least one of an electronic storage medium, a magnetic storage medium, and an optical storage medium.

Various embodiments comprise a computer-implemented method for executing a generic software package, which method may comprise providing the generic software package. The generic software package may comprise a digital file, an identification module, a configuration module, and meta-data. The method may also comprise identifying a target platform where the digital file is to be installed. In addition, the identification module may perform the identifying the target platform. The method may also comprise configuring the meta-data to be compatible with the target platform. In at least one embodiment, the configuration module may perform the configuring the meta-data. In addition, the method may comprise reading the meta-data, which may indicate a feature of the digital file. The method may also comprise installing the digital file on the target platform based on the meta-data.

In some embodiments, the method for executing a generic software package may also comprise extracting the digital file and the meta-data and including the digital file in a native software package. The method may also comprise removing the native software package. The native software package may be a folder that comprises the digital file and the meta-data. In other embodiments, the native package may be a binary file. Furthermore, installing the digital file may comprise installing the digital file using a software package manager. In at least one embodiment, the method comprises executing an installation module. The generic software package may include the installation module, and the installation module may be adapted to install the digital file.

Various embodiments include a computer readable medium comprising instructions executable on a processor. The instructions may be operable to implement providing a generic software package comprising a digital file, an identification module, a configuration module, and meta-data. The instructions may also be operable to identify, using the identification module, a target platform where the digital file is to be installed. The instructions may further be operable to configure, using the configuration module, the meta-data to be compatible with the target platform. Also, the instructions may be operable to read the meta-data, which may indicate a feature of the digital file. The instructions may also be operable to install the digital file on the target platform based on the meta-data. The computer readable medium may be at least one of an electronic storage medium, a magnetic storage medium, and an optical storage medium.

Features from any of the above-mentioned embodiments may be used in combination with one another in accordance with the general principles described herein. These and other embodiments and features will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
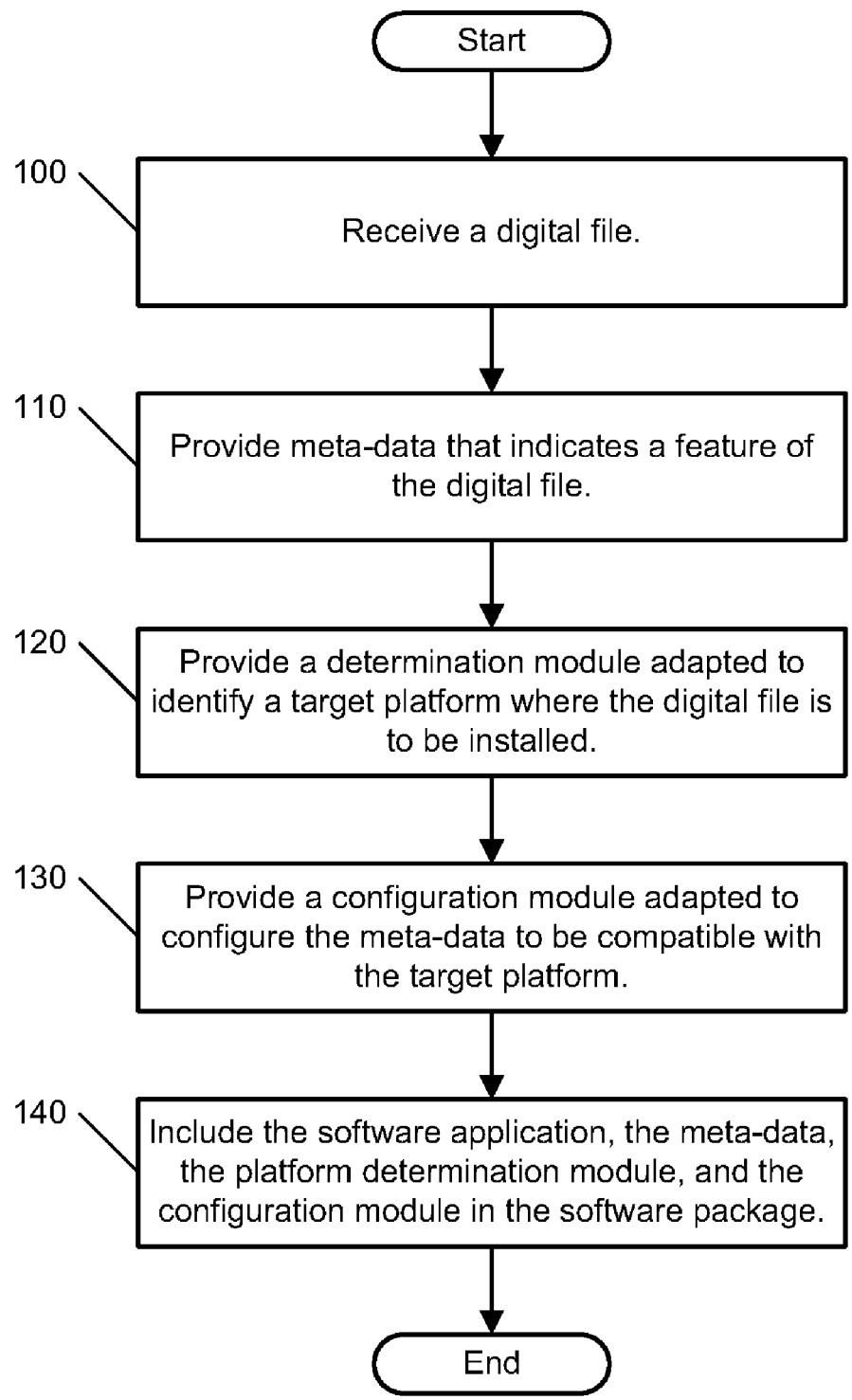
FIG. 1 is a flow diagram illustrating an exemplary method for creating a generic software package according to certain embodiments.

Throughout the drawings and disclosure, identical descriptions indicate similar, but not necessarily identical, elements. While specific embodiments have been shown by way of example in the drawings and will be described in detail, the exemplary embodiments described in the instant disclosure are susceptible to various modifications and alternative forms. One of skill in the art will understand that the exemplary embodiments described herein are not intended to be limited to the particular forms disclosed. Rather, the instant disclosure covers all modifications, equivalents, and alternatives falling within the scope defined by the appended claims.

DETAILED DESCRIPTION OF EXEMPLARY EMBODIMENTS

The following is intended to provide a detailed description of various exemplary embodiments and should not be taken to be limiting in any way. For purposes of readability, this detailed description is organized into sections, with the following introduction providing an overview of exemplary embodiments for creating and executing software packages.

Introduction

Various exemplary methods and systems for creating and executing generic software packages on a target platform are described and/or illustrated herein. As discussed in greater detail below, generic software packages may simplify distribution for software vendors and may streamline an end user's experience in finding and using the software packages. Generic software packages may also increase efficiency in software distribution systems. Furthermore, generic software packages may provide many other improvements over other types of software packages and other software distribution and installation systems.

According to various embodiments, a software vendor can create a generic software package capable of configuring itself to be compatible with a target platform. As explained below, a generic software package is a software package that may include at least one of a configuration module and a determination module. FIG. 1 is an exemplary flow diagram illustrating various steps for creating a generic software package. As discussed in greater detail below in connection with FIGS. 11 and 12, the exemplary steps of FIG. 1 may be performed by one or more computing devices that may include receiving, providing, and including mechanisms.

In certain embodiments, and as discussed in greater detail below, the receiving mechanism receives a digital file at step 100. The digital file may be a software application or any other type of computer-readable file. The providing mechanism may then provide meta-data at step 110, a determination module at step 120, and a configuration module at step 130. Finally, the including mechanism may include the software application, the meta-data, the determination module, and the configuration module in the generic software package at step 140.

The determination module, the configuration module, and the meta-data may each play a role in installing the digital file when the software package is executed. Meta-data may be included in the digital file or may be provided separately. In certain embodiments, the meta-data may indicate a feature of the digital file, as discussed in greater detail below. For example, meta-data may indicate the author of the package or actions to be performed at the time of installation. In addition, as discussed in greater detail below, the determination module may identify a target platform where the digital file is to be installed, while the configuration module may configure the meta-data to be compatible with the target platform identified by the determination module. These features may allow the digital file to be installed on various different operating systems and package management systems.

The steps presented in FIG. 1 cover numerous different embodiments for creating a generic software package. In some embodiments, a software vendor (or other software developer or distributor) provides a software program and meta-data to a package-creation module, and the package-creation module then creates a generic software package (see FIG. 3 and corresponding description). In other embodiments, a package-conversion module creates a generic software package by converting a software package native to at least one platform into a generic software package (see FIGS. 4 and 5 and corresponding description). For example, the package-conversion module may convert a LINUX standard base software package into a generic software package capable of being installed on a variety of target platforms.

Figure 2:
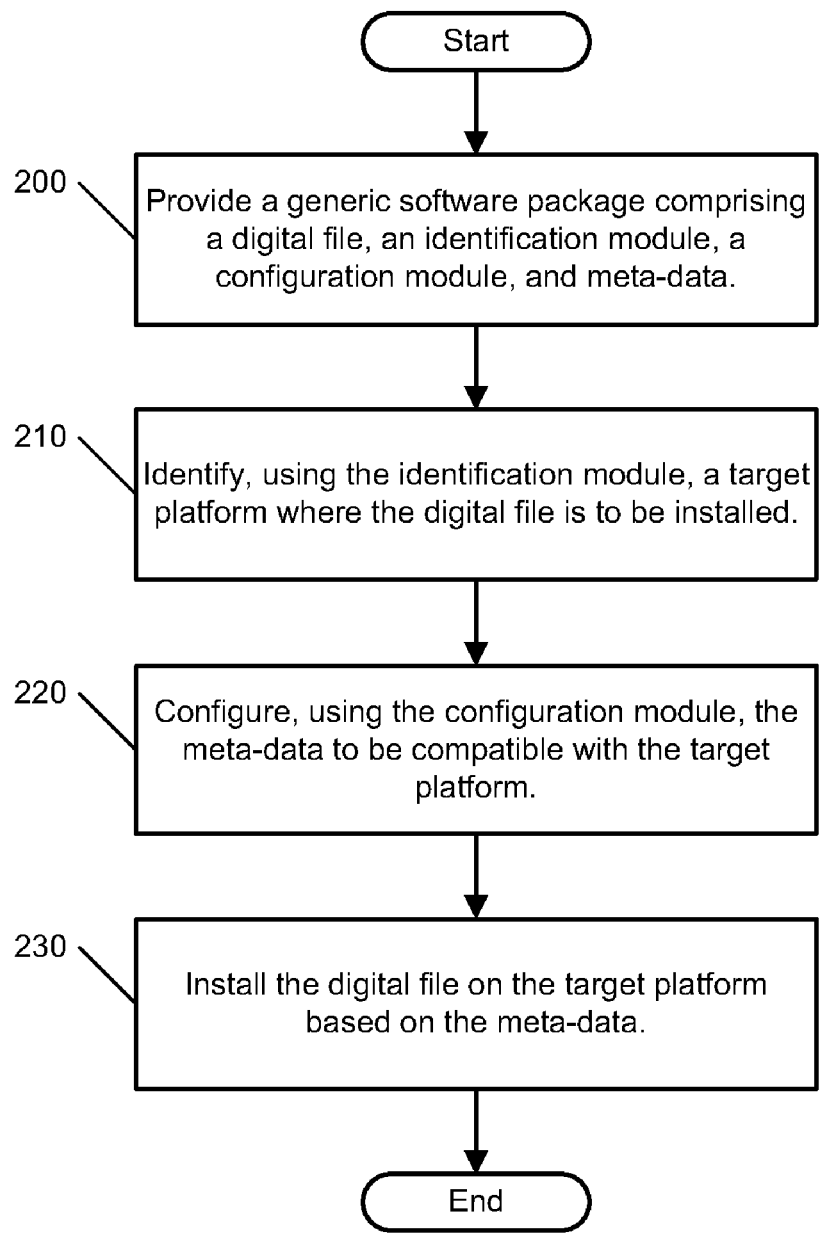
FIG. 2 is a flow diagram illustrating an exemplary method for executing a generic software package according to certain embodiments.

Various exemplary methods for executing a generic software package are also described and illustrated herein. In certain embodiments, when a user executes a generic software package, the generic software package performs the steps to install the digital file included in the software package. FIG. 2 is an exemplary flow diagram illustrating various steps involved in executing a generic software package. As with the steps in FIG. 1, and as discussed in greater detail below in connection with FIGS. 11 and 12, the steps of FIG. 2 may be performed by one or more computing devices. In certain embodiments, the computing device(s) may include providing and installing mechanisms. In at least one embodiment, these providing and installing mechanisms may perform the steps to execute a generic software package.

As illustrated in FIG. 2, in certain embodiments, the providing mechanism provides a generic software package at step 200. A generic software package may be provided by a user, a storage device, a network device, or another source. Alternatively, the computing device may provide the generic software package by identifying or executing the generic software package. The generic software package may include a digital file, an identification module, a configuration module, and meta-data.

At step 210, the identification module may identify the target platform where the digital file is to be installed. After the identification module identifies the target platform, the configuration module may configure the meta-data to be compatible with the target platform at step 220. Once the meta-data is configured to be compatible with the target platform, the installing mechanism may install the digital file on the target platform at step 230. As explained in greater detail below, the installing mechanism may use the meta-data for various purposes during installation.

The exemplary steps presented in FIG. 2 cover numerous different embodiments for executing a generic software package. In some embodiments, a package management system may execute the generic software package and install the digital file (see FIG. 8 and the corresponding description). In other embodiments, the generic software package may include an installation module, and the installation module may install the digital file (see FIG. 9 and the corresponding description).

The remaining disclosure describes additional examples and embodiments for creating and executing generic software packages. First, an exemplary method for assembling a generic software package is described in connection with FIG. 3. An exemplary process for converting a native software package into a generic software package is then described in connection with FIGS. 4 and 5, with examples of generic software package formats discussed in connection with FIGS. 6 and 7. Next, various exemplary methods for installing software packages are described in connection with FIGS. 8 and 9, with an example of a native software package discussed in connection with FIG. 10. Exemplary embodiments of how the concepts presented in this disclosure can be applied to specific operating systems are then provided. A discussion of an exemplary computer system and network for implementing one or more of the exemplary embodiments described and/or illustrated herein is then provided in connection with FIGS. 11 and 12.

Assembling a Generic Software Package

As previously mentioned, a generic software package may be a software package that includes at least one of a configuration module and a determination module. As explained in greater detail below, the configuration module may configure the generic software package to be compatible with multiple platforms or a single platform.

Figure 3:
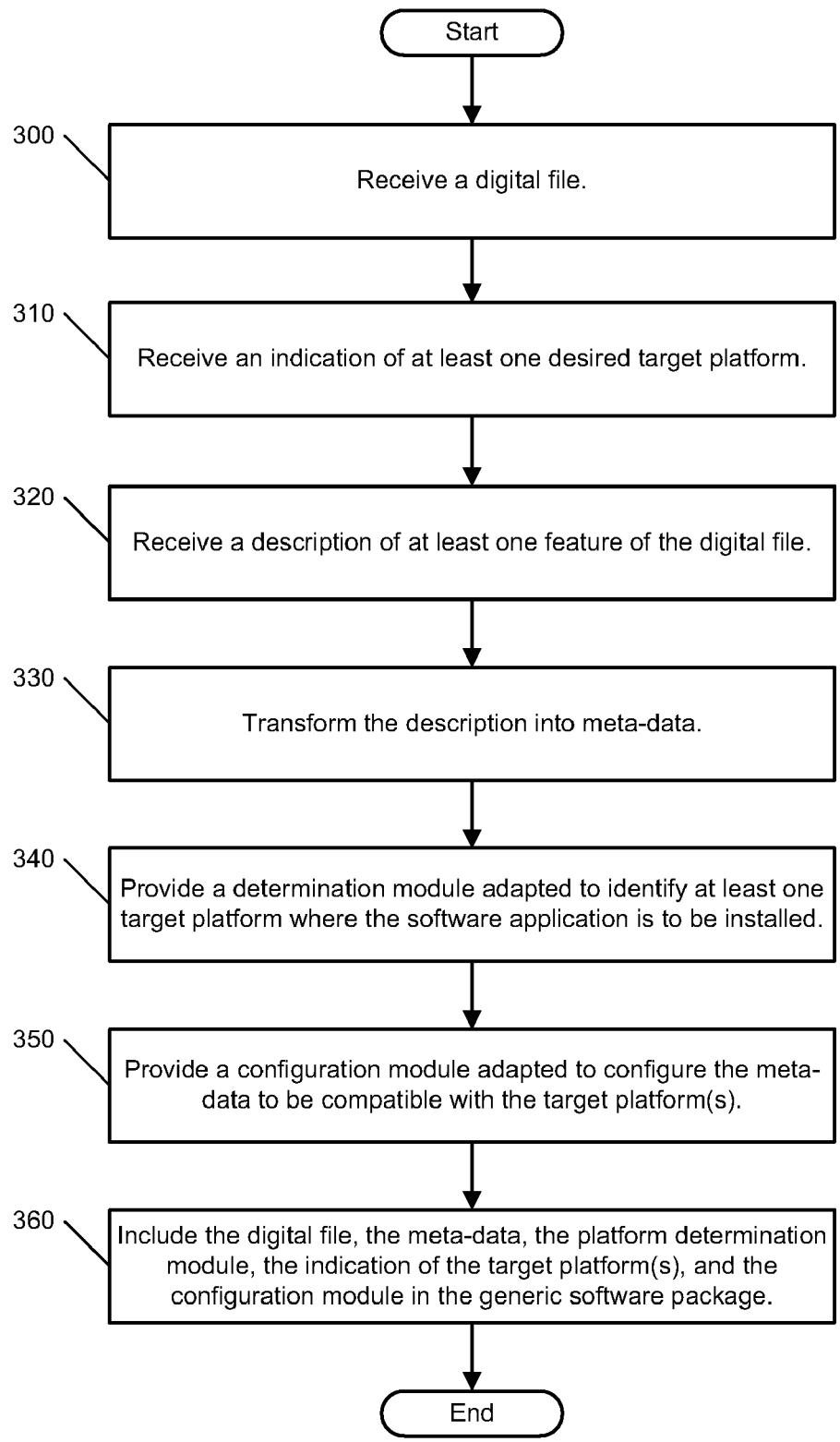
FIG. 3 is a flow diagram illustrating an exemplary method for assembling a generic software package according to certain embodiments.

FIG. 3 is a flow diagram illustrating an exemplary method for assembling a software package. As with FIGS. 1 and 2, one or more computing devices may be used to perform the steps recited in FIG. 3. In certain embodiments, the computer device(s) include at least one receiving mechanism, at least one providing mechanism, a transforming mechanism, and an including mechanism. As discussed in greater detail below in connection with FIGS. 11 and 12, the functions of these mechanisms may be implemented using various software and/or hardware configurations.

In the exemplary method illustrated in FIG. 3, a first receiving mechanism receives a digital file at step 300 and a second receiving mechanism receives an indication of one or more desired target platforms at step 310. As used herein, the term platform generally refers to a specific type of computer hardware, software, or both. For example, a platform can be the hardware components that constitute a computing system, such as a Central Processing Unit (CPU) model or computer family (e.g., INTEL x86 machines, RISC processor based machines, etc.). A platform can also be an operating system (e.g., WINDOWS, SOLARIS, BSD, LINUX, MAC OS, etc.), a specific version of an operating system, or other software (e.g., a virtual machine, such as a Java virtual machine) capable of running a software program. In some embodiments, a platform may comprise a software management system (e.g., RPM, DPKG, SOFTWARE DISTRIBUTOR, etc.). In other embodiments, the term platform may refer to computing devices other than desktop and laptop computers. For example, a platform may refer to personal digital assistant platforms (such as PALM and WINDOWS CE), gaming platforms (such as XBOX and PLAY STATION gaming platforms), and/or cell phone platforms (such as JAVA ME and WINDOWS MOBILE). The term platform can also refer to network platforms.

In some embodiments, a software vendor may specify, using an input device connected to the computing device, one or more desired target platforms at step 310. Alternatively, the computing device may automatically select one or more desired target platforms at step 310. For example, if the digital file is in a format that is only compatible with certain platforms, the computing device may identify the digital file's format and provide an indication of platforms compatible with that file format. In other embodiments, the computing device can indicate a default set of platforms and a user may be allowed to modify the default set of platforms.

In step 320, a third receiving mechanism may receive a description of at least one feature of the digital file. Upon receipt, the digital file, the indication of the desired target platform(s), and the description of the digital file may be stored temporarily in a storage device. Alternatively, the digital file, the indication of the desired target platform(s), and the description of the digital file may be included in the generic software package when received (i.e., without being stored temporarily in memory). In an exemplary embodiment, a software vendor desiring to create a software package may send the digital file to the computing device via the first receiving mechanism. A software vendor may also send the description to the computing device via the second receiving mechanism. In other embodiments, the computing device can automatically provide a pre-defined description of the digital file. For example, the computing device may identify the file format of the digital file and then provide a pre-defined description based on the file type. The computing device may also provide a default description, with the software vendor being able to modify the default description or the pre-defined description.

The description of at least one feature of the digital file (received in exemplary step 320 of FIG. 3) may comprise a description of any amount or type of information desired; including, for example, information about the author of the digital file, dependencies of the digital file, the version or modification date of the digital file, the functionality of the digital file, and/or other information descriptive of the properties of the digital file, each of which may be considered to be "features" of the digital file. The description may also include processing instructions for the digital file, removal instructions for the digital file, and/or other instructions regarding how to handle the digital file.

Although the first, second, and third receiving mechanisms are discussed herein as being separate receiving mechanisms, the first, second, and third receiving mechanisms may also be the same receiving mechanism or may be included in two different receiving mechanisms. These receiving mechanisms may be input ports or other receiving hardware in a computing device, a processor, or other computer hardware, as discussed in greater detail below in connection with FIGS. 11 and 12. The receiving mechanisms can also be software or firmware modules configured to receive the digital file, the indication of the desired target platform(s), and/or the description of the digital file.

After the receiving mechanism receives the description of at least one feature of the digital file at step 320, the transforming mechanism may transform the description into meta-data at step 330. Because the description received in step 320 may be provided in various formats, in certain embodiments the transforming mechanism may be required to change the format of the description to conform with the meta-data format for a generic software package. Thus, the meta-data may carry the same information that the description provides, but in a different format. In certain embodiments, step 110 in FIG. 1 (providing meta-data) can include both steps 320 and 330 of FIG. 3 (receiving a description and transforming the description into meta-data).

In certain embodiments, the digital file, the indication of the desired target platform(s), and the description of the digital file may be provided by a user (e.g., a software vendor), while the determination module and the configuration module may be provided by the computing device. Alternatively, in certain embodiments, a user may provide the determination module and/or the configuration module.

In at least one embodiment, at step 340 a first providing mechanism may provide the determination module, which may be adapted to identify at least one target platform where the software application is to be installed, as discussed in greater detail below. In some embodiments, the determination module may be adapted to automatically detect the target platform(s). In other embodiments, the determination module may query a user to determine the target platform(s). Once the determination module makes a determination as to the target platform(s), the determination module may pass an indication of the target platform(s) to the configuration module.

In step 350, a second providing mechanism may provide a configuration module adapted to configure the meta-data to be compatible with the target platform(s). The configuration module may configure the meta-data in a number of ways. For example, the computing device may provide the configuration module with several sets of meta-data, with each set of meta-data corresponding to a platform. In this example, the configuration module may configure the meta-data by selecting the meta-data sets that are compatible with the target platform(s). Alternatively, the configuration module may include instructions for transforming generic meta-data into a format compatible with the target platform(s). In some embodiments, the configuration module includes several sets of configuration instructions, with each set of instructions corresponding to a different platform. The configuration module may then select the set of instructions that corresponds to the target platform(s), and the selected set of instructions may then configure the meta-data to be compatible with the target platform(s).

As with the receiving mechanisms described previously, the first and second providing mechanisms may be the same providing mechanism or may be included in two different providing mechanisms. For example, as discussed in greater detail below in connection with FIGS. 11 and 12, the providing mechanisms may be an input port on a computing device or other computer hardware. The providing mechanisms may also be a software module configured to provide the determination module and the configuration module. As previously mentioned, in some embodiments, the determination module and the configuration module are automatically provided and included in the generic software package. In other embodiments, a user may input or edit the determination module and/or the configuration module. In these embodiments, the user input may be considered the providing mechanism.

In certain embodiments, the determination and configuration modules may be coded in a scripting language (e.g., TOOL COMMAND LANGUAGE (TCL), PERL, AWK, CH, etc.). In addition, the determination and configuration modules may be encoded in either platform independent code (i.e., code configured to run on multiple platforms) or platform dependent code. The determination and configuration modules may also be separate modules or may be included in a single module, with the functionality of both modules being provided in a single set of instructions.

In certain embodiments, an including mechanism may include the digital file, the meta-data, and the indication of the target platform(s) in the generic software package. The including mechanism may also comprise a software module configured to aggregate data and files into a software package. Additionally or alternatively, the including mechanism may comprise a software module adapted to create generic software packages. In some embodiments, the determination module and the configuration module may be included in a generic software package template. In one exemplary embodiment, the including mechanism may add the digital file, the meta-data, and the indication of the target platform(s) to the generic software package template. In other embodiments, the including mechanism may build a generic software package by combining the digital file, the meta-data, the determination module, the indication of the target platform (s), and the configuration module.

Converting a Native Software Package into a Generic Software Package

Figure 4:
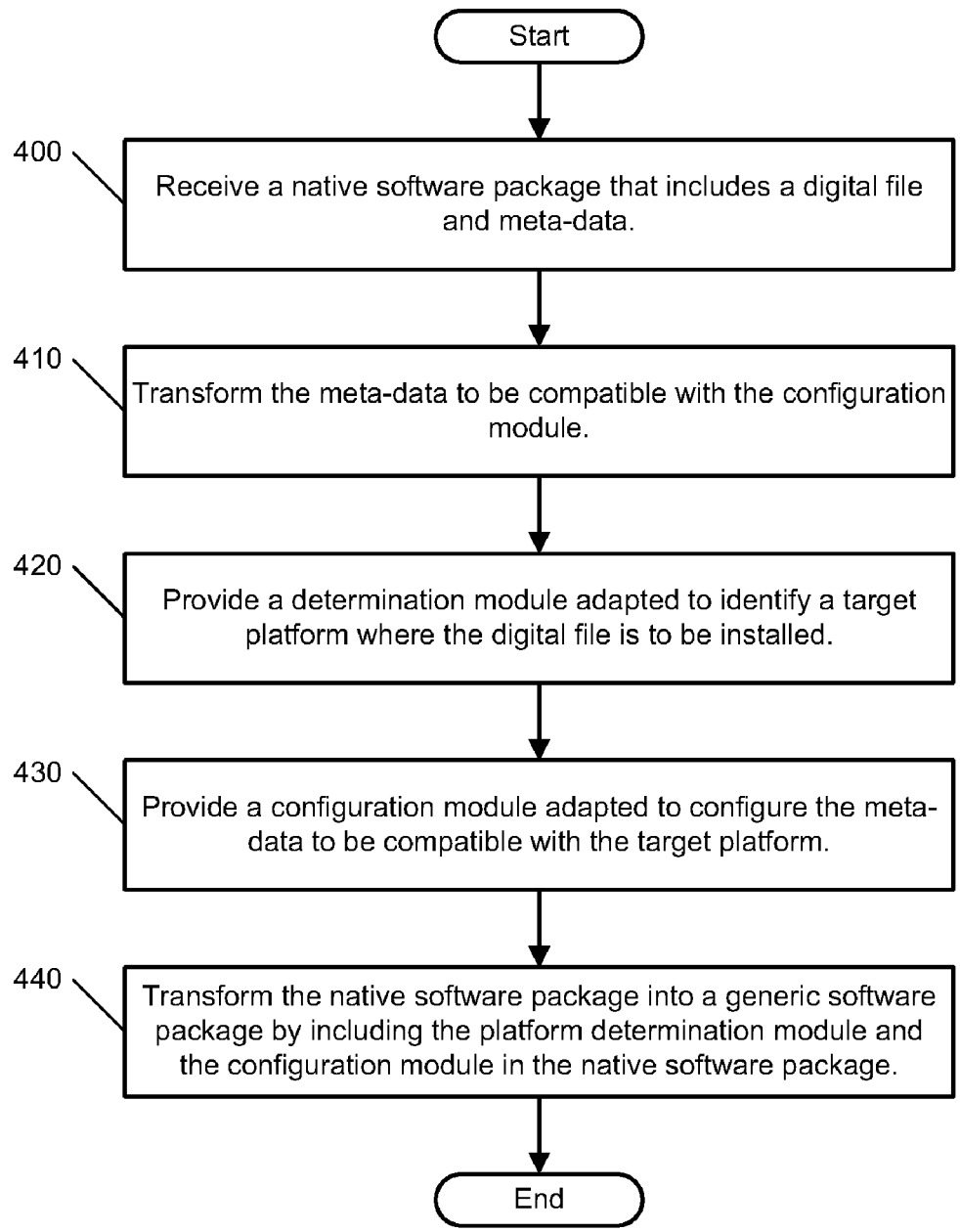
FIG. 4 is a flow diagram illustrating an exemplary method for converting a software package native to at least one platform into a generic software package according to certain embodiments.

As previously mentioned, a generic software package can be created by assembling the generic software package or by converting a native software package into a generic software package. As described in greater detail below, a native software package may be converted into a generic software package in at least two ways. For example, a computing mechanism may transform the native software package into a generic software package. Alternatively, the computing mechanism may create a generic software package based on the contents of the native software package. FIG. 4 is a flow diagram illustrating an exemplary method for transforming a native software package (e.g., a software package native to at least one platform) into a generic software package. As detailed above, native software packages may include RPM-compatible packages, SOLARIS-compatible packages, UNIX-compatible packages, MAC OS X-compatible packages, and any other software packages native to a platform.

As with FIGS. 1-3, one or more computing devices may be used to perform the steps recited in FIG. 4. As discussed in detail below, these computing devices may include a receiving mechanism, at least one providing mechanism, and at least one transforming mechanism, each of which may be implemented using various software and/or hardware configurations.

As shown in FIG. 4, at step 400 the receiving mechanism may receive a native software package that includes a digital file and meta-data. Since a native software package includes both a digital file and meta-data, receiving a native software package may include both receiving the digital file (step 100 of FIG. 1) and providing meta-data (step 110 of FIG. 1). Thus, step 400 of FIG. 4 may be broken up into two steps: (1) receiving a digital file in a native package, and (2) providing meta-data from a native package. At step 410, a first transformation module may transform the meta-data so that it is compatible with the configuration module. For example, the meta-data from the native package (native meta-data) may be transformed into generic meta-data. In certain embodiments, instead of transforming the meta-data, the computing device selects generic meta-data based on the meta-data in the native software package. In other embodiments, the native meta-data is included in the generic software package without being transformed. In one embodiment, the configuration module may be adapted to configure the native meta-data into a format compatible with the target platform.

At step 420, a first providing mechanism may provide a determination module adapted to identify a target platform where the digital file is to be installed. At step 430, a second providing mechanism may provide a configuration module adapted to configure the meta-data to be compatible with the target platform. As with previous mechanisms described herein, the first and second providing mechanisms may be the same providing mechanism or may be included in two different providing mechanisms. Finally, at step 440, a second transformation module may transform the native software package into a generic software package by including the determination module and the configuration module in the native software package.

Figure 5:
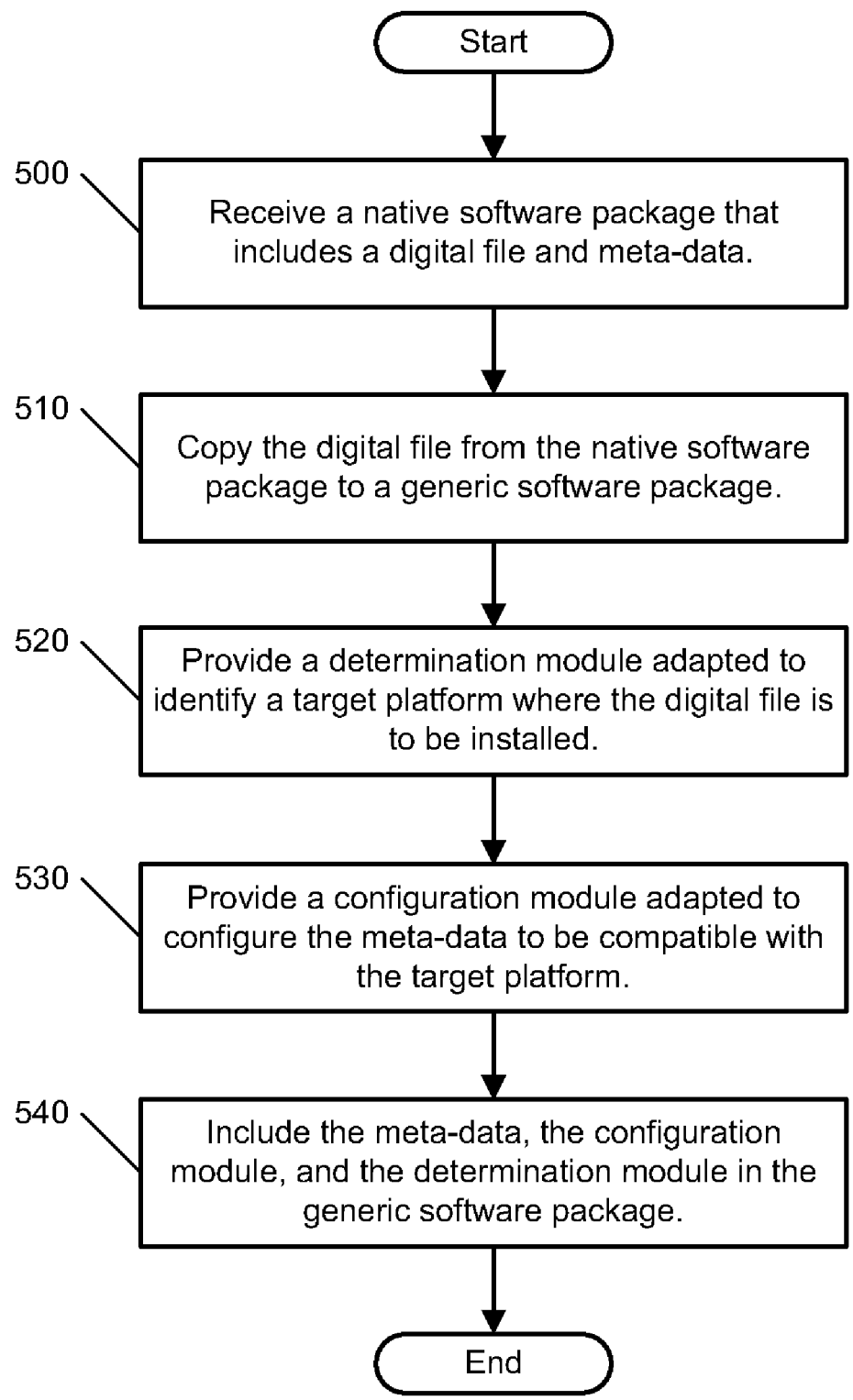
FIG. 5 is a flow diagram illustrating an exemplary method for converting a software package native to at least one platform into a generic software package according to additional embodiments.

Instead of transforming the native software package, a computing device may form a generic software package from the contents of the native package. FIG. 5 is a flow diagram illustrating an exemplary method for creating a generic software package based on the contents of a native software package. As with previous embodiments, one or more computing devices may be used to perform the steps recited in FIG. 5. These computing device(s) may include a receiving mechanism, a copying mechanism, at least one providing mechanism, and an including mechanism, each of which may be implemented using various software and/or hardware configurations.

As illustrated in FIG. 5, at step 500 the receiving mechanism may receive a native software package that includes a digital file and meta-data. In some embodiments, the native software package includes additional data or documentation. After receiving the native software package, a copying mechanism may copy the digital file from the native software package to a generic software package at step 510. For example, the generic software package may be a specific folder in a directory and the copying mechanism may copy the digital file from the native software package into the specific folder.

At step 520, a first providing mechanism may provide a determination module adapted to identify a target platform where the digital file is to be installed. At step 530, a second providing mechanism may provide a configuration module adapted to configure the meta-data to be compatible with the target platform. In various embodiments, a providing mechanism provides the determination module and the configuration module at the same time. In addition, the native meta-data may be included in the generic software package without being transformed.

At step 540, an including mechanism may include the meta-data, the determination module, and the configuration module in the generic software package. As previously mentioned, the generic software package may comprise a specific folder in a directory. Similarly, the native software package may comprise a folder in a directory. In certain embodiments, the including mechanism includes the meta-data, the determination module, and the configuration module in the generic software package by moving or copying these items from the native software package folder into the generic software package folder. In this example, the generic software package comprises a folder that includes the meta-data, the determination module, the configuration module, the meta-data, and the digital file.

Instead of or in addition to converting a native software package into a generic software package, a user may also perform the inverse operation. In other words, a user may extract a native software package from a generic software package and then install the native software package manually. This may provide additional flexibility in installation and may allow the user to take advantage of advanced installation options.

Generic Software Package Format

Figure 6:
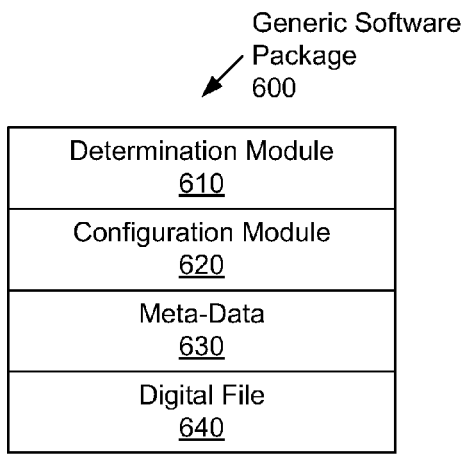
FIG. 6 is a block diagram of an exemplary generic software package according to certain embodiments.

FIG. 6 is a block diagram of an exemplary generic software package 600. Generic software package 600 may include a determination module 610, a configuration module 620, meta-data 630, and a digital file 640. In certain exemplary embodiments, generic software package 600 may include a collection of files (e.g., determination module 610, configuration module 620, and digital file 640), and a description of features of the digital file (e.g., meta-data 630). This description of features may include handling instructions for the digital file and a description of the digital file. In certain embodiments, determination module 610 and configuration module 620 can be included in the meta-data. Determination module 610, configuration module 620, meta-data 630, and digital file 640 may also be included in the generic software package as a single file.

Digital file 640 generally represents any type of digital file capable of distribution through a software package. In certain embodiments, digital file 640 may be a collection of bytes or bits that are grouped as an individual entity. In additional embodiments, digital file 640 may be a compiled software application (e.g., object code in the form of a binary file). Alternatively, digital file 640 may not be a software application. For example, digital file 640 may be a documentation file, a WINDOWS manager theme file, source code, a word processing file, a database, a spreadsheet, a multimedia file, a binary file, or any other type of digital file capable of distribution through a software package. Digital file 640 may also include multiple files and/or different types of files.

In certain embodiments, the files in generic software package 600 may be set up to run consecutively. For example, when a computing system executes generic software package 600, the determination module may run first and then the configuration module may run. Alternatively, generic software package 600 may include an execution script that calls the different modules in generic software package 600 without regard to the actual configuration of the software package.

Figure 7:
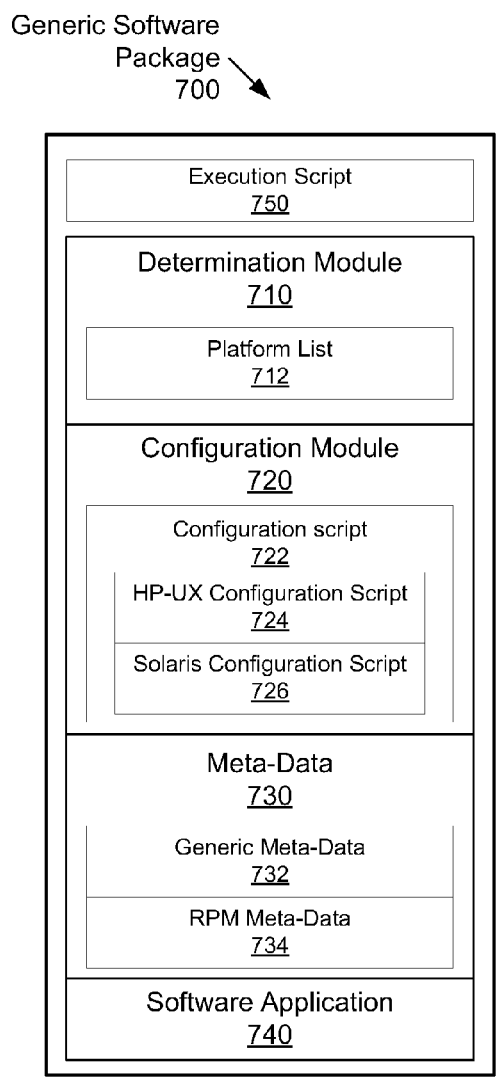
FIG. 7 is a block diagram of an exemplary generic software package according to additional embodiments.

FIG. 7 is a exemplary block diagram of a generic software package 700. In certain embodiments, generic software package 700 may comprise an execution script 750. Execution script 750 may be configured to control execution of generic software package 600. For example, in certain embodiments execution script 750 may call determination module 610 and configuration module 620. Execution script 750 may then start the package manager on the target platform to initialize installation of software application 740.

As illustrated in FIG. 7, generic software package 700 may also include a determination module 710, a configuration module 720, meta-data 730, and a software application 740. In some embodiments, determination module 710 and configuration module 720 may be included in execution script 750. In addition, as illustrated in FIG. 7, determination module 710 may include a platform list 712. Platform list 712 generally represents any type or form of list that indicates any number or type of platforms on which generic software package 700 may be installed, such as HP-UX, SOLARIS, RPM, etc. In certain embodiments, platform list 712 is a default platform list that is included in all generic software packages. In these embodiments, execution script 750 may allow a software vendor to modify the default platform list. In at least one embodiment, platform list 712 may be formed from an indication of one or more desired target platforms provided by a software vendor. Alternatively, platform list 712 may be automatically generated based on the software application format, the meta-data, or a description of software application 740. In certain embodiments, generic software package 700 can be configured for compatibility with the platforms in platform list 712.

Determination module 710 may be configured to determine the target platform and provide configuration module 720 with an indication of the target platform. In certain embodiments, configuration module 720 may be adapted to configure generic meta-data 732 for compatibility with the target platform. For example, in the exemplary embodiment illustrated in FIG. 7, configuration module 720 includes a configuration script 722, an HP-UX configuration script 724, and a SOLARIS configuration script 726. According to some embodiments, configuration script 722 configures generic meta-data 730 by selecting a platform-specific configuration script capable of transforming meta-data 730 into meta-data compatible with the target platform. For example, if SOLARIS is the target platform, configuration script 722 will execute SOLARIS configuration script 726. SOLARIS configuration script 726 would then transform generic meta-data 732 into meta-data compatible with SOLARIS. As will be appreciated, configuration module 720 may also comprise, in addition to HP-UX configuration script 724 and SOLARIS configuration script 726, any number of additional platform-specific configuration scripts.

As illustrated in FIG. 7, generic software package 700 may also include platform-specific meta-data, such as RPM meta-data 734. In certain embodiments, configuration script 722 may be adapted to select the platform-specific meta-data corresponding to the target platform. For example, if RED HAT LINUX is the target platform, configuration script 722 may select RPM meta-data 734. RPM meta-data 734 may then be included in a native software package for installation on RED HAT LINUX. Thus, configuration script 722 may configure meta-data for compatibility with a target platform by running a platform-specific configuration script or by selecting platform-specific meta-data. In certain embodiments, because some software packages may be specially formatted binary files, transforming generic meta-data into meta-data compatible with such files may be a complex task. For example, because RPM packages are specially formatted binary files, configuration script 722 may select platform-specific meta-data. In contrast, some software packages (e.g., packages for IBM AIX, HP-UX, and MAC OS X) may be folders with specific structures and files. For these software packages, the generic meta-data may be transformed into meta-data compatible with the target operating system.

Any number of variations and embodiments of software package 700 fall within the scope of the instant disclosure. For example, while FIG. 7 shows that software package 700 includes both platform-specific configuration scripts and platform-specific meta-data, some software packages may include only platform-specific configuration scripts, only platform-specific meta-data, or neither platform-specific configuration scripts or meta-data. In addition, while FIG. 7 shows platform list 712 included with determination module 710, in some embodiments platform list 712 may be included in meta-data 730 or execution script 750. Generic software package 700 may also be configured to execute automatically, may be invoked from a command line, or may be executed in any other manner.

Executing a Generic Software Package

Figure 8:
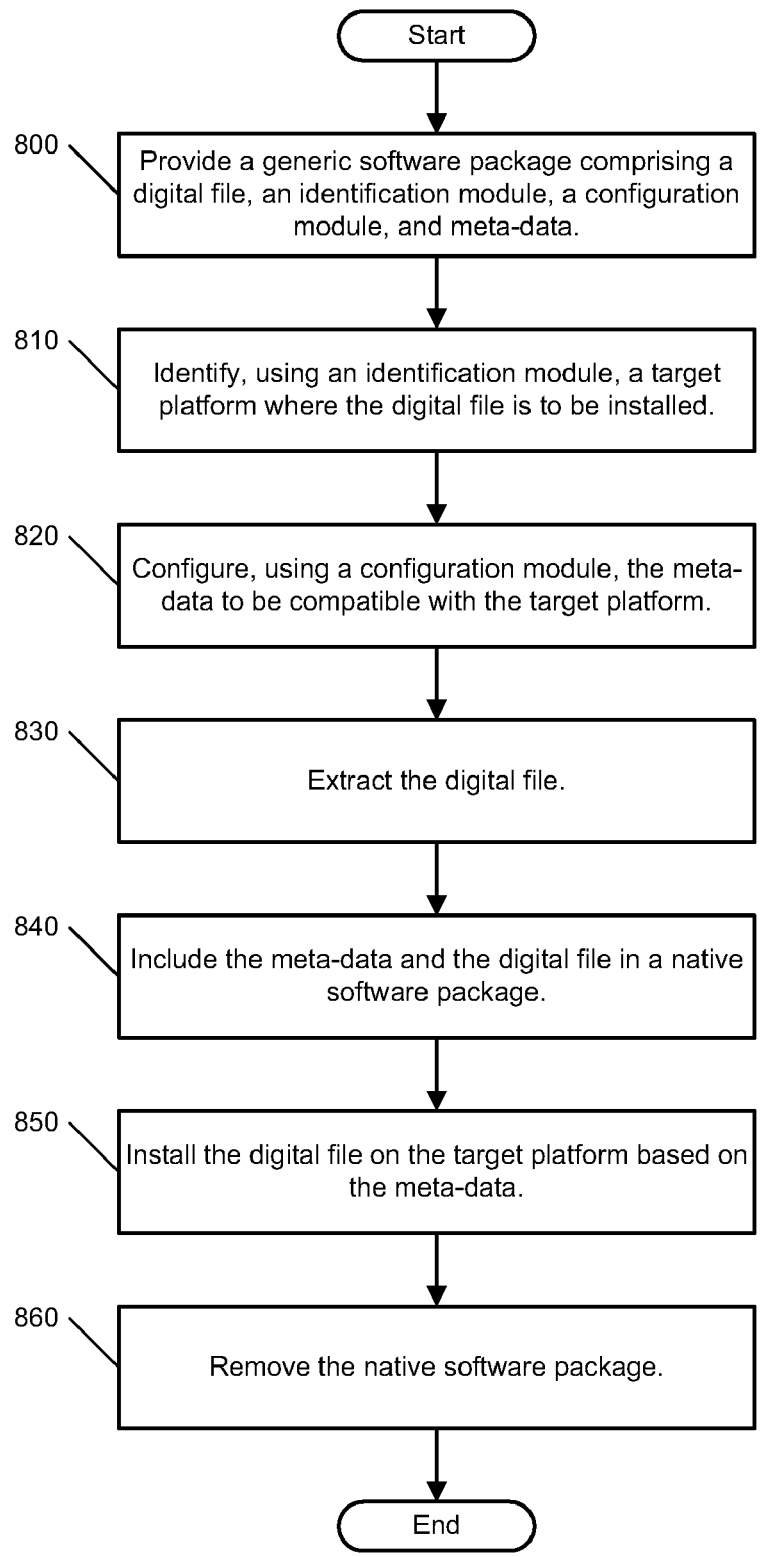
FIG. 8 is a flow diagram illustrating an exemplary method for executing a generic software package to install a digital file using a software package management system according to certain embodiments.
Figure 9:
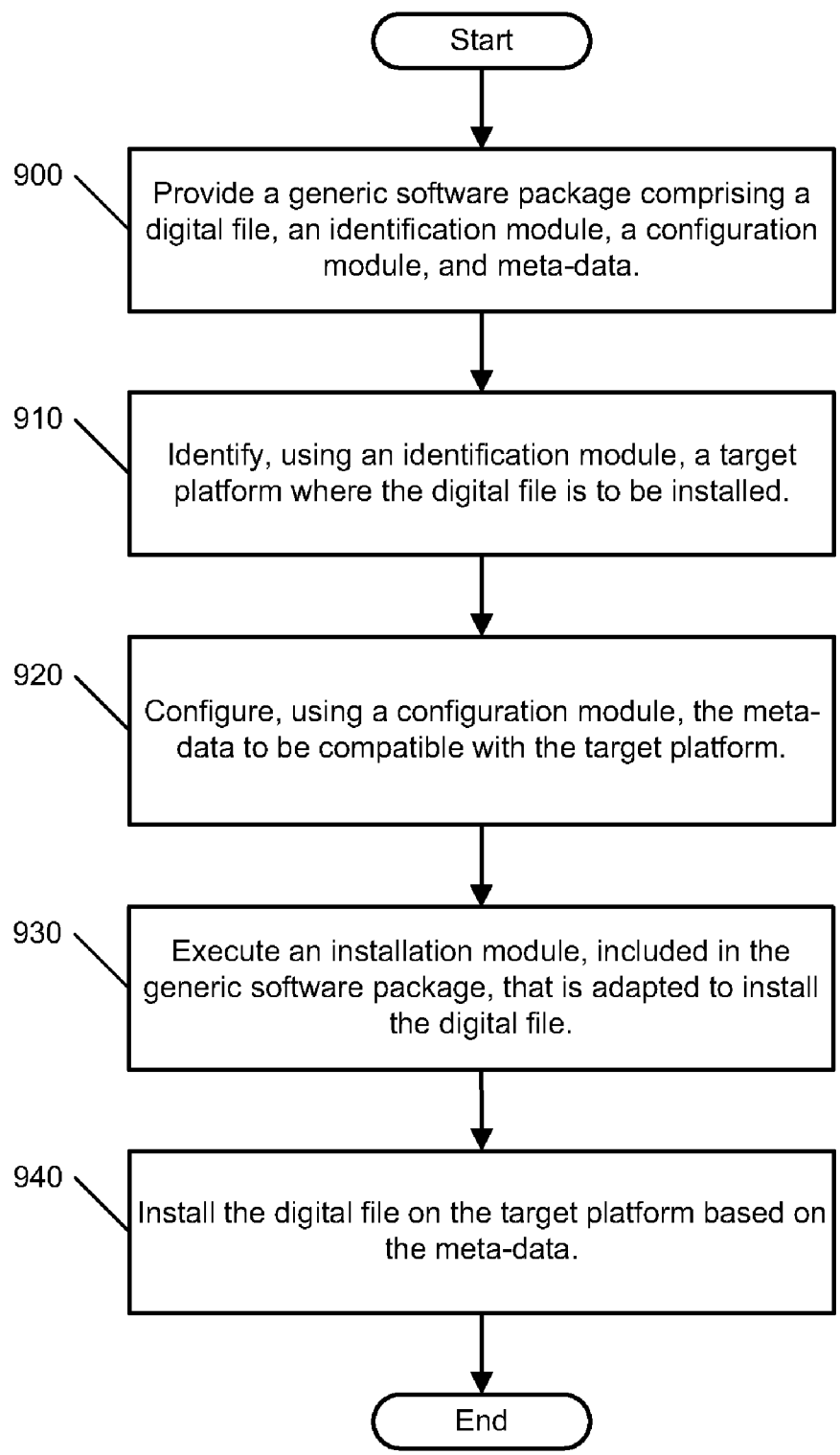
FIG. 9 is a flow diagram illustrating an exemplary method for executing a generic software package using an installation module to install a digital file according to certain embodiments.

FIGS. 8 and 9 illustrate two exemplary methods for executing a generic software package to install a digital file from the generic software package. FIG. 8 is a flow diagram illustrating an exemplary method for installing a digital file using a package management system or similar installation mechanism. As with previous embodiments, one or more computing devices may be used to perform the exemplary steps recited in FIG. 8. These computing devices may include a providing mechanism, an extracting mechanism, an including mechanism, and an installing mechanism, each of which may be implemented using various software and/or hardware configurations.

As shown in FIG. 8, at step 800 the providing mechanism may provide a generic software package. As detailed above, this generic software package may comprise a digital file, an identification module, a configuration module, and meta-data. In certain embodiments, the providing mechanism may provide the generic software package by identifying the generic software package or by retrieving the generic software package from a memory device, a network device, a user input, or another source. The providing mechanism may also be a mechanism for creating a generic software package and may provide the generic software package by creating it.

At step 810, the identification module may identify a target platform where the digital file is to be installed. In certain embodiments, the identification mechanism may automatically identify the target platform (e.g., by running a script that detects the identity of the target platform). Alternatively, the identification mechanism may ask a user to select or input a target platform. In some embodiments, the identification mechanism is an identification module.

At step 820, the configuration module may configure the meta-data to be compatible with the target platform. For example, the configuration module may rearrange the order of information in the meta-data into a format compatible with a software management system installed on a target operating system. The configuration module may also modify the syntax of information in the meta-data. In addition, the configuration module may include different sets of instructions for each supported platform. In this example, the configuration module selects the set of instructions associated with the target platform. The selected set of instructions may then transform the meta-data in accordance with the format required by the target platform. Alternatively, the configuration module may include a table or database that includes formatting details for each supported platform. In this example, instead of running a separate set of instructions for each platform, the configuration module could run a single set of instructions that modifies the meta-data based on the formatting details associated with the target platform.

At step 830, the extracting mechanism may extract the digital file. In some embodiments, the extracting mechanism extracts the digital file by copying the digital file from the generic software package into a temporary location or into a native software package. If the generic software package is a folder, the extracting mechanism may copy the digital file from the folder.

In order to prepare a native software package for installation on the target platform, the including mechanism may include the meta-data and the digital file in a native software package at step 840. Once the native software package is prepared, an installation mechanism may install the digital file on the target platform based on the meta-data at step 850. In at least one embodiment, the installation mechanism is a package management system. The package management system may be a package management system that was installed on or included with an operating system. A package management system may be able to install, verify, and manage the packages on a computer system. Some examples of package management systems include the RPM PACKAGE MANAGER, PACMAN, PORTAGE, FREEBSD PORTS, MACPORTS, AND SOFTWARE DISTRIBUTOR.

As mentioned in step 850, the digital file may be installed based on the meta-data. For example, the meta-data may include dependencies (i.e., indications of other software for installation or use of the digital file). Similarly, the installation mechanism may check to verify whether the dependencies listed in the meta-data are satisfied. In addition, meta-data may include checksum information. In some embodiments, the installation mechanism may use the checksum information to detect errors in the generic software package. In certain embodiments, the meta-data includes instructions or information regarding the installation procedure for the digital file. The installation mechanism may then use these instructions or information when installing the digital file.

At step 860, a removal mechanism may remove the native software package. Removing the native software package may be advantageous when the computing device created the native software package in temporary storage. However, in some embodiments, the native software package does not necessarily need to be removed.

A digital file may be installed using an installation module included in the generic software package instead of using a package management system. FIG. 9 shows a flow diagram of an exemplary method for installing a software package using an installation module. As with previous embodiments, one or more computing devices may be used to perform the exemplary steps recited in FIG. 9. These computing devices may include a providing mechanism and an execution mechanism, each of which may be implemented using various software and/or hardware configurations.

As illustrated in FIG. 9, at step 900 the providing mechanism may provide a software package that includes a digital file, an identification module, a configuration module, and meta-data. At step 910, the identification module may identify a target platform where the digital file is to be installed. At step 920, the configuration module may configure the meta-data to be compatible with the target platform. Then, at step 930, an execution mechanism may execute the installation module. In certain embodiments, the execution mechanism may be an execution script included in the generic software package. In addition, the execution mechanism and the installation module may be included in a single module or script.

At step 940, the installation module may install the digital file on the target platform based on the meta-data. The installation module may be a custom-made installation module for the generic software package or may be a commercially available installation module (also referred to as an "installer"). Some examples of installers include WINDOWS INSTALLER, INSTALLSHIELD, SETUPBUILDER, WISE, INSTALLAWARE, BITROCK, INNOSETUP, NSIS, WIX, and INSTALLER VISE. Alternatively, the installation module may also be a self-extracting archive program, which is an application that contains code for extracting an archive (such as a compressed digital file) from a software package. In at least one embodiment, the installation module may include multiple installers. In such an embodiment, the installation module may select an installer based on the identification of the target platform.

Native Package Format

Figure 10:
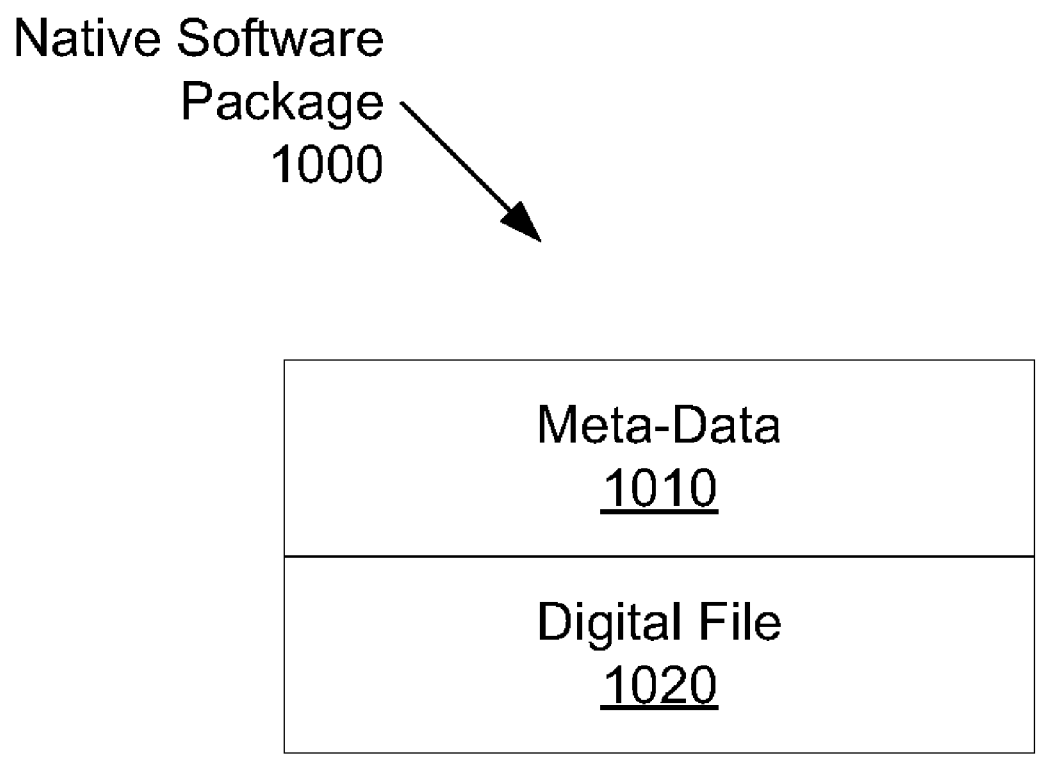
FIG. 10 is a block diagram of an exemplary native software package according to certain embodiments.

FIG. 10 is a block diagram of an exemplary native software package 1000. Native software package 1000 may include meta-data 1010 and a digital file 1020. Other components and features of a native package may differ depending on the target platform for the native package. For example, the components and features of native software package 1000 may differ depending on whether the native software package 1000 is created from a generic software package and/or converted into a generic software package.

Exemplary Target Platforms

IBM AIX, HP-UX, and MAC OS X

For IBM AIX, HEWLETT-PACKARD UNIX (HP-UX), and MAC OS X (before version 10.5) a native software package (such as exemplary native software package 1000) may be a folder having a specific structure and files. MAC OS X version 10.5 introduces a new type of package similar to RPM and DEBIAN. Thus, in order to create a native software package for these platforms, an execution script in a generic software package may prepare the structure, add meta-data, and add a digital file (or files) to a temporary folder. The temporary folder may then be prepared according to the rules dictated by the operating system's package management system. Thus, an identification module may need to identify the operating system's package management system in order to properly configure a native package.

SOLARIS

A SOLARIS software package is a collection of files and directories in a form that conforms to SUN's application binary interface. The procedure for creating a SOLARIS software package may be similar to the procedure for creating IBM AIX, HP-UX, and MAC OS X software packages. Many software packages, including SOLARIS software packages, may include a control file. Listing 1 provides an example of the meta-data that may be included in a SOLARIS software package control file:

| Listing 1 | |
|---|---|
| PKG = | "SolarisProgram" |
| NAME = | "GreatProgram" |
| ARCH = | "" |
| VERSION = | "2.3.1" |
| CATEGORY = | "application" |
| VENDOR = | "Altiris" |
| EMAIL = | "jsmith@altiris.com" |
| PSTAMP = | "John Smith" |
| BASEDIR = | "/usr/local" |

In the example control file shown in Listing 1, PKG refers to the name of the package, NAME refers to the name of the digital file, ARCH refers to the version of the operating system, VERSION refers to the version number for the digital file, CATEGORY refers to the category of the digital file, VENDOR refers to the digital file author or sponsor, EMAIL refers to an email address, PSTAMP refers to the person who performed the port, and BASEDIR refers to the directory where the files will install. Additional control files may also be included in Listing 1 as desired. In certain embodiments, this information may be considered to be meta-data.

DEBIAN GNU/LINUX

DEBIAN GNU/LINUX (DEBIAN) software packages may be tar archives that include two zipped tar archives. One of the zipped tar archives may contain meta-data and the other zipped tar archive may contain a digital file or files. The typical software management program for LINUX DEBIAN may be DPKG. Binary DEBIAN software packages may include a text file called debian-binary, a compressed tarball called control.tar.gz, and a compressed tarball called data-.tar.gz. The control.tar.gz file may include the control file, a postint file, and a prerm file. The postint file may contain instructions on post-installation management. In addition, the prerm file may contain removal instructions. The control.tar.gz file may also comprise checksums. The postint file, the control.tar.gz file, and the prerm file may comprise meta-data. The data.tar.gz file may contain the software package's digital file or files.

Listing 2 is an example of a DEBIAN control file:

| Listing 2 | |
|---|---|
| PACKAGE: | Super Software |
| VERSION: | 1.1.3 |
| ARCHITECTURE: | All |
| DEPENDS: | libwww-perl |
| RECOMMENDS: | |
| SUGGESTS: | |
| INSTALLED-SIZE: | 2054 |

-continued

Listing 2

| MAINTAINER: | John Smith |
|---|---|
| CONFLICTS: | |
| DESCRIPTION: | A great program. |

With respect to the fields in the example control file shown in Listing 2, PACKAGE refers to the name of the software package, VERSION refers to the version number of the package, ARCHITECTURE refers to supported architecture, DEPENDS refers to necessary related packages, RECOMMENDS refers to recommended related software packages, SUGGESTS refers to suggested related software packages, INSTALLED-SIZE refers to the installed size of the software, MAINTAINER refers to the software package maintainer, and DESCRIPTION refers to a description of the software package. DEBIAN control files may also include additional fields not shown in Listing 2.

In order to create a DEBIAN software package, the control file and the scripts may be included in a directory named DEBIAN. A DEBIAN package may then be created using the dpkg command with the -b (build) option. For example, an execution script in a generic software package may create a DEBIAN package by executing the following command: dpkg -b directory packagename.deb. In this command, directory refers to the file-system containing the digital file or files.

LINUX/RPM

In LINUX RPM, a native package may be a specially formatted binary file. The binary file may contain some meta-data (in binary format) and the digital file. The digital file may be in the form of a CPIO archive, which is a standard format for archiving files. In order to create a LINUX RPM package, an execution script in a generic software package may configure the meta-data, create the CPIO archive from the digital files, and add the newly created CPIO archive to the LINUX RPM package.

Computer System and Network

Figure 11:
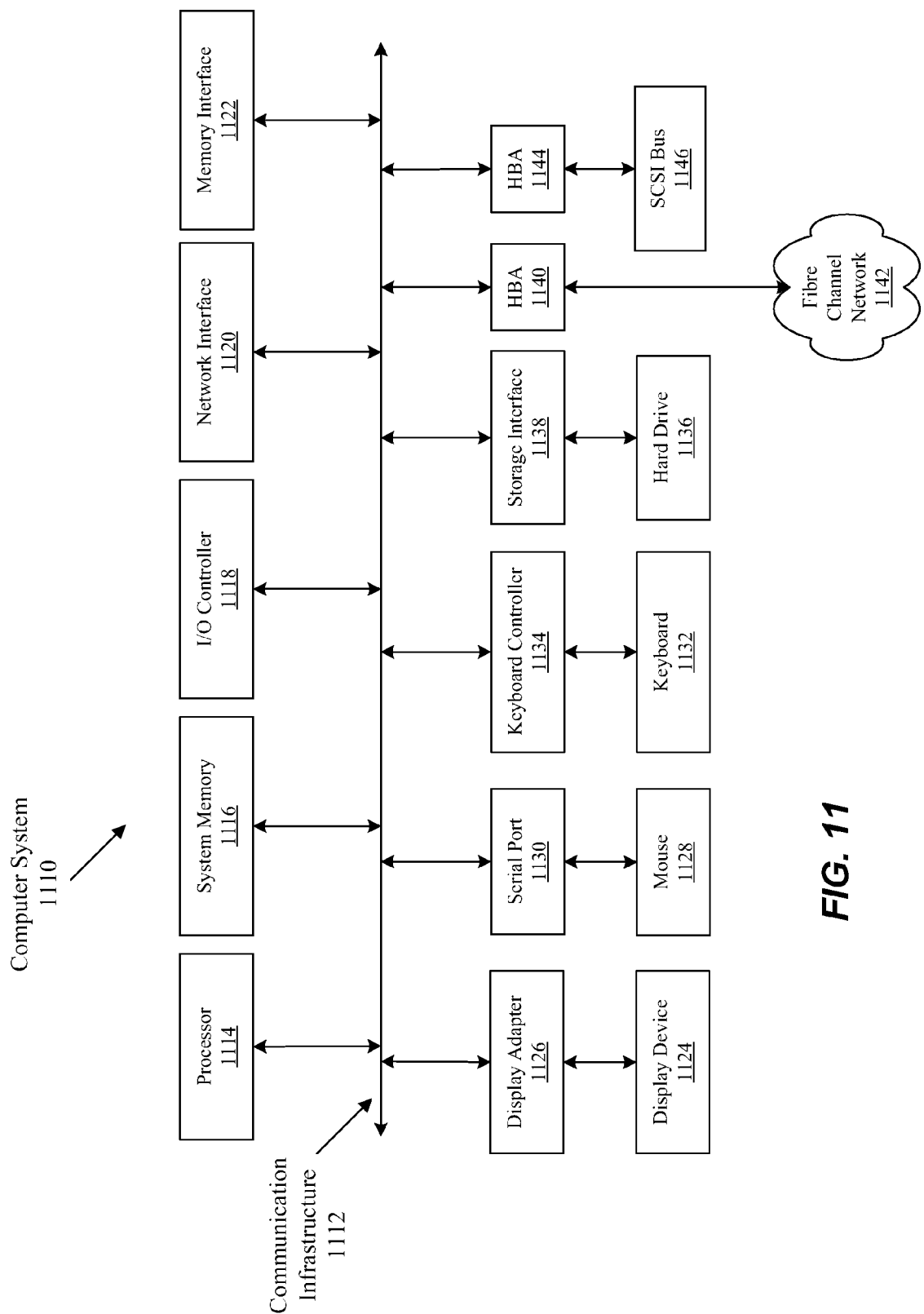
FIG. 11 is a block diagram of an exemplary computer system suitable for implementing certain embodiments.

FIG. 11 is a block diagram of an exemplary computer system 1110 suitable for creating and executing a generic software package, such as the exemplary generic software packages described herein. Computer system 1110 generally represents any single or multi-processor computing device capable of executing single-threaded or multi-threaded applications. Computer system 1110 may include a communication infrastructure 1112 that interconnects the major subsystems of computer system 1110. Communication infrastructure 1112 generally represents any form or structure capable of facilitating communication between one or more electronic components; including, for example, a communication bus (e.g., ISA, PCI, AGP, etc.) or a network.

The major subsystems of computer system 1110 may include a processor 1114, a system memory 1116, an Input/Output (I/O) controller 1118, a network interface 1120, and a memory interface 1122. Processor 1114 generally represents any form of CPU or other computing device capable of interpreting instructions and processing data. Instructions provided to processor 1114 may cause processor 1114 to perform the functions of one or more of the exemplary embodiments set forth in the instant disclosure. The instructions provided to processor 1114 may be instructions from a software application or module. For example, processor 1114 may execute the determination or configuration modules discussed in detail herein. Processor 1114 may also be used, for example, as a providing, including, installing, receiving, transforming, copying, extracting, removing, and/or executing mechanism.

System memory 1116 generally represents any form of storage device or medium capable of storing data and other computer-readable instructions. System memory 1116 may be used, for example, as a providing mechanism, a receiving mechanism, or a copying mechanism. In some embodiments, system memory 1116 is a random access memory (RAM) unit, but system memory 1116 may also include ROM, flash RAM, or other similar memory devices. I/O controller 1118 generally represents any form of computer board or module capable of coordinating and controlling the input and output functions of a computing device. I/O controller 1118 may be used, for example, as a providing, including, installing, receiving, transforming, copying, extracting, removing, and/or executing mechanism.

Network interface 1120 generally represents a communication device capable of interconnecting computer system 1110 with a private or public network. Network interface 1120 may be, for example, a network card, a wireless card, or a USB or FIREWIRE port. Network interface 1120 may provide a direct connection to a remote server via a direct network link to the Internet. Network interface 1120 may provide such a connection through, for example, an Ethernet connection, a modem, a digital cellular telephone connection, a BLUETOOTH network, an IEEE 802.11 wireless network, a digital satellite data connection, or the like.

Network interface 1120 may allow computer system 1110 to engage in distributed or remote computing. For example, network interface 1120 may receive instructions from a remote computer, or network interface 1120 may send instructions to a remote computer for execution. Accordingly, network interface 1120 may be used as a providing, including, installing, receiving, transforming, extracting, removing, executing, and/or copying mechanism.

Memory interface 1122 generally represents a device capable of allowing software and data to be transferred from a storage device to other components of computer system 1110. For example, memory interface 1122 may comprise an cartridge interface, a memory socket, or a disk drive. Memory interface 1122 may be a floppy drive, an optical disk drive, a flash interface, or any other type of memory interface. In certain embodiments, memory interface may be a providing, including, installing, receiving, transforming, extracting, removing, executing, and/or copying mechanism.

The major subsystems of computer system 1110 may also include a display device 1124, a mouse 1128, and a keyboard 1132. Display device 1124 may be coupled to communication infrastructure 1112 via a display adapter 1126, mouse 1128 may be coupled to communication infrastructure 1112 via a serial port 1130, and keyboard 1132 may be coupled to communication infrastructure 1112 via a keyboard controller 1134. Display adapter 1126 may be configured to forward graphics, text, and other data from communication infrastructure 1112 (or from a frame buffer, as known in the art) for display on display device 1124. Display device 1124 generally represents any form of device capable of visually displaying information forwarded by display adapter 1126. Keyboard 1132 and mouse 1128 generally represent any type of user interface to computer system 1110 and may be a providing, including, installing, receiving, transforming, copying, extracting, removing, and/or executing mechanism.

Computer system 1110 may include a hard drive 1136 coupled to communication infrastructure 1112 via a storage interface 1138. Hard drive 1136 generally represents any form of storage device or medium capable of storing data and other computer-readable instructions. For example, hard drive 1136 may be a magnetic disk drive or a tape drive. Hard drive 1136 may also comprise other similar structures for allowing computer software, data, or other computer-readable instructions to be loaded into computer system 1110. For example, hard drive 1136 may be configured to read and write software, data, or other computer-readable information. In certain embodiments, hard drive 1136 may be a providing, including, installing, receiving, transforming, extracting, removing, executing, and/or copying mechanism. Hard drive 1136 may also be a part of computer system 1110 or may be separate and accessed through other interface systems.

Computer system 1110 may also include a host bus adapter (HBA) interface card 1140 and an HBA card 1144. HBA card 1140 may be operative to connect with a fiber channel network 1142, and HBA card 1144 may be operative to connect to a SCSI bus 1146. HBA cards 1140 and 1142 may be providing, including, installing, receiving, transforming, extracting, removing, executing, and/or copying mechanisms.

In certain embodiments, computer system 1110 can be any kind of computing device, including personal data assistants (PDAs), network appliances, X-WINDOW terminals, or other such computing devices. Computer system 1110 may be any type of device configured to execute the functions and modules discussed in the instant disclosure. For example, computer system 1110 may access and execute generic software packages, software applications, and software modules stored on hard drive 1136 or system memory 1116. Computer system 1110 may also access and execute generic software packages, software applications, and software modules.

The operating system provided on computer system 1110 may be MS-DOS, MS-WINDOWS, OS/2, UNIX, LINUX, or any other operating system or platform. Computer system 1110 may also support a number of Internet access tools, including, for example, an HTTP-compliant web browser having a JavaScript interpreter, such as NETSCAPE NAVIGATOR, MICROSOFT INTERNET EXPLORER, or other similar navigators.

Many other devices or subsystems may be connected to computer system 1110. Conversely, all of the devices shown in FIG. 11 need not be present to practice the embodiments of the instant disclosure. The devices and subsystems can be interconnected in different ways from that shown in FIG. 11. Indeed, computer system 1110 may use any number of software, firmware, and hardware configurations. For example, one or more of the exemplary embodiments disclosed herein may be encoded as a computer program (also referred to as computer software, software applications, computer-readable instructions, or computer control logic) and stored in a computer-readable medium. The computer-readable medium containing the computer program may then be loaded into computer system 1110 using a removable storage drive or downloaded to computer system 1110 via network interface 1120 over a communication path, such as the Internet or other network.

All or a portion of the computer program stored on the computer-readable medium may then be stored in system memory 1116 and/or various portions of hard drive 1136. When executed by processor 1114, a computer program loaded into computer system 1110 may cause processor 1114 to perform the functions of one or more of the exemplary embodiments described and/or illustrated herein.

Additionally or alternatively, one or more of the exemplary embodiments described and/or illustrated herein may be implemented in firmware and/or hardware. For example, one or more of the exemplary embodiments disclosed herein may be implemented using various hardware components such as, for example, application specific integrated circuits (ASICs).

Figure 12:
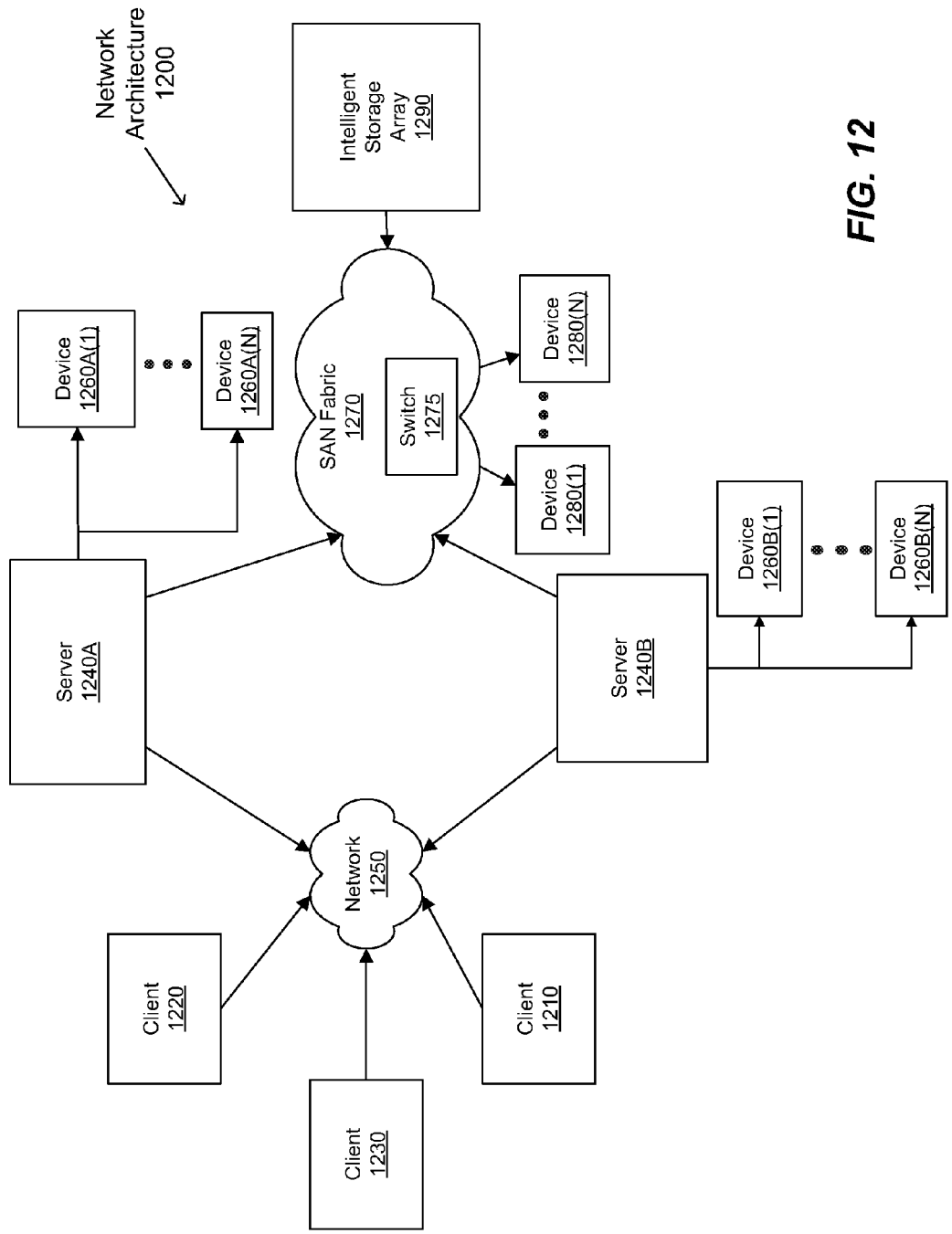
FIG. 12 is a block diagram of an exemplary network architecture suitable for implementing certain embodiments.

FIG. 12 is a block diagram depicting an example of a network architecture 1200 in which client systems 1210, 1220, and 1230, as well as storage servers 1240A and 1240B (any of which can be implemented using computer system 1110), may be coupled to a network 1250. Storage server 1240A is further depicted as having storage devices 1260A(1)-(N) directly attached, and storage server 1240B is depicted with storage devices 1260B(1)-(N) directly attached. In certain embodiments, storage servers 1240A and 1240B may be connected to a Storage Area Network (SAN) fabric 1270, although connection to a storage area network is not required for operation of the embodiments of the instant disclosure. SAN fabric 1270 may support access to storage devices 1280(1)-(N) by storage servers 1240A and 1240B and by client systems 1210, 1220, and 1230 via network 1250. Intelligent storage array 1290 is also shown as an example of a specific storage device accessible via SAN fabric 1270.

With reference to computer system 1110, network interface 1120 (or some other method) can be used to provide connectivity from each of client computer systems 1210, 1220, and 1230 to network 1250. Client systems 1210, 1220, and 1230 may be able to access information on storage server 1240A or 1240B using, for example, a web browser or other client software. Such software may allow client systems 1210, 1220, and 1230 to access data hosted by storage server 1240A, storage server 1240B, storage devices 1260A(1)-(N), storage devices 1260B(1)-(N), storage devices 1280(1)-(N), or intelligent storage array 1290. FIG. 12 depicts the use of a network such as the Internet for exchanging data, but the instant disclosure is not limited to the Internet or any particular network-based environment.

Storage servers 1240A and 1240B generally represent computing devices, such as an application server or database server, configured to provide various database services and/or to run certain software applications. Similarly, storage devices 1260A(1)-(N), storage devices 1260B(1)-(N), storage devices 1280(1)-(N), and intelligent storage array 1290 generally represent any form of storage device or medium capable of storing data and other computer-readable instructions.

In at least one embodiment, all or a portion of one or more of the exemplary embodiments disclosed herein may be encoded as a computer program and loaded onto and executed by storage server 1240A, storage server 1240B, storage devices 1260A(1)-(N), storage devices 1260B(1)-(N), storage devices 1280(1)-(N), intelligent storage array 1290, or any combination thereof. All or a portion of one or more of the exemplary embodiments disclosed herein may also be encoded as a computer program, stored in server 1240A, run by server 1240B, and distributed to client systems 1210, 1220, and 1230 over network 1250. For example, network architecture 1200 may include providing, including, installing, receiving, transforming, extracting, removing, executing, and/or copying mechanisms.

The embodiments of the instant disclosure may be implemented in various computer devices, systems, methods, and networks. For example, generic software packages may be used by software vendors to simplify software distribution. Instead of creating and distributing separate packages for each supported platform, software vendors may simply create a generic software package that can be configured for compatibility with each supported platform. Generic software packages may also streamline the end-user experience. With generic software packages, end users may not need to worry about the platform dependencies of some software packages.

The embodiments of the instant disclosure may also be implemented in software management and software deployment. Software deployment activities can include a software release, installation, activation, deactivation, update, uninstall, and/or retire. For example, software deployment occurs when a bundle of specific software, a collection of multiple software, or even an operating system, is distributed. Such a distribution may be accomplished through a third party distribution system. Deployment is a daily occurrence for most large organizations and enterprises, and involves many challenges that may be addressed by a distribution system that incorporates one or more of the embodiments of the instant disclosure.

Problems with deployment include unreliable rollouts that cause catastrophic crashes of mission-critical applications, unmanaged environments with no control over applications, processes, versions and licenses, non-standard configurations that raise the cost of maintaining PCs, and unreliable applications that frustrate end users and cause help desk calls, ultimately reducing IT and end-user productivity. Deployment programs and systems may incorporate the embodiments disclosed herein to address these issues. For example, deploying software through a generic software package may streamline deployment by simplifying software compatibility issues.

The features of the present disclosure might also be incorporated into other software delivery solutions. Software delivery solutions may provide secure distribution of applications and updates throughout an organization. Incorporating the embodiments of the instant disclosure into a software delivery solution may provide additional efficiency for software distributions and updates.

While the instant disclosure has been depicted, described, and is defined by reference to particular embodiments of the disclosure, such references do not imply a limitation on the disclosure, and no such limitation is to be inferred. The embodiments recited in this disclosure are capable of considerable modification, alteration, and equivalents in form and function, as will occur to those ordinarily skilled in the pertinent arts. The depicted and described embodiments are examples only, and are not exhaustive of the scope of the invention.

The foregoing disclosure sets forth various embodiments via the use of block diagrams, flowcharts, and examples. It will be understood by those within the art that each block diagram component, flowchart step, operation and/or component described and/or illustrated herein may be implemented, individually and/or collectively, by a wide range of hardware, software, firmware, or any combination thereof. The foregoing disclosure also describes embodiments including components contained within other components (e.g., the various elements shown as components of computer system 1110). Such architectures are merely examples, and many other architectures can be implemented to achieve the same functionality.

Furthermore, embodiments of the instant disclosure have been described in the context of fully functional computer systems; however, those skilled in the art will appreciate that one or more of the exemplary embodiments described and/or illustrated herein may be capable of being distributed as a program product in a variety of forms, regardless of the particular type of signal bearing media used to actually carry out the distribution. Examples of signal bearing media include recordable media such as floppy disks and CD-ROM, transmission type media such as digital and analog communications links, as well electronic storage media, magnetic storage media, optical storage media, communications medium conveying signals encoding instructions, and other distribution systems.

As previously mentioned, the above-discussed embodiments may be implemented by software modules and scripts that perform certain tasks. The software modules and scripts discussed herein may include script, batch, or other executable files. In addition, these software modules and scripts may be stored on a machine-readable or computer-readable storage medium, such as a disk drive. In some embodiments, the modules and scripts can be stored within a computer system memory to configure the computer system to perform the functions of the module.

The process parameters and sequence of steps described and/or illustrated herein are given by way of example only and can be varied as desired. For example, while the steps of FIGS. 1-5, 8, and 9 are shown in a particular order, these steps do not necessarily need to be performed in the order illustrated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for creating a generic software package, the method comprising:
   receiving a digital file;
   providing meta-data that indicates a feature of the digital file;
   providing a determination module adapted to identify a target platform where the digital file is to be installed;
   providing a configuration module adapted to configure the meta-data to be compatible with the target platform;
   including the determination module and the configuration module in the generic software package such that the generic software package comprises the digital file, the meta-data, the determination module, and the configuration module, wherein
   a processor performs the including the determination module and the configuration module in the generic software package.

2. The method of claim 1, further comprising:
   receiving a description of the digital file;
   transforming the description of the digital file into the meta-data.

3. The method of claim 1, further comprising:
   receiving an indication of at least one desired target platform;
   including the indication of the at least one desired target platform in the generic software package, wherein the determination module is adapted to select the target platform from the at least one desired target platform.

4. The method of claim 3, wherein the determination module is adapted to automatically identify the target platform.

5. The method of claim 1, further comprising receiving a native software package, the native software package comprising the digital file and the meta-data, wherein:
   receiving the native software package comprises receiving the digital file;
   receiving the native software package comprises providing the meta-data;
   the native software package is native to a non-target platform.

6. The method of claim 5, further comprising transforming the native software package into the generic software package by including the determination module and the configuration module in the native software package; wherein including the determination module and the configuration module in the generic software package comprises including the platform determination module and the configuration module in the native software package.

7. The method of claim 6, further comprising transforming the meta-data to be compatible with the configuration module.

8. The method of claim 5, further comprising copying the digital file from the native software package to the generic software package.

9. The method of claim 1, further comprising including an installation module in the generic software package.

10. The method of claim 1, wherein the target platform is an operating system.

11. The method of claim 1, wherein the feature of the digital file is at least one of:
a characteristic of the digital file;
an operation to be performed on the digital file.

12. The method of claim 1, wherein the configuration module is adapted to create a native software package that is native to the target platform.

13. The method of claim 1, wherein the configuration module is adapted to configure the meta-data to be compatible with the target platform by selecting predefined meta-data compatible with the target platform.

14. The method of claim 1, wherein the configuration module is adapted to configure the meta-data to be compatible with the target platform by transforming the meta-data into meta-data compatible with the target platform.

15. A system for creating a generic software package, comprising:
a first input adapted to receive a digital file;
a second input adapted to receive an indication of a feature of the digital file;
a storage medium adapted to store a determination module and a configuration module, the determination module being adapted to identify a target platform where the digital file is to be installed, and the configuration module being adapted to configure the indication of the feature of the digital file to be meta-data compatible with the target platform;
a first processor coupled to the storage medium, the first input, and the second input, the first processor being adapted to include the determination module and the configuration module in the generic software package such that the generic software package comprises the digital file, the meta-data, the determination module, and the configuration module.

16. The system of claim 15, further comprising:
a third input adapted to receive an indication of at least one desired target platform;
a second processor adapted to include the indication of the at least one desired target platform in the generic software package;
wherein the configuration module is adapted to select the target platform from the at least one desired target platform.

17. The system of claim 15, further comprising a fourth input adapted to receive a native software package, the native software package comprising the digital file and the meta-data.

18. The system of claim 15, further comprising a third processor configured to transform the native software package into the generic software package by including the determination module and the configuration module in the native software package.

19. The system of claim 15, wherein a single processor comprises the first, second, and third processors and a single input comprises the first, second, third, and fourth inputs.

20. A non-transitory computer readable medium comprising instructions executable on a processor, the instructions being operable to implement each of:
receiving a digital file;
providing meta-data that indicates a feature of the digital file;
providing a determination module adapted to identify a target platform where the digital file is to be installed;
providing a configuration module adapted to configure the meta-data to be compatible with the target platform;
including the determination module and the configuration module in a generic software package such that the generic software package comprises the digital file, the meta-data, the determination module, and the configuration module.

21. The computer readable medium of claim 20, wherein the computer readable medium is at least one of an electronic storage medium, a magnetic storage medium, and an optical storage medium.

* * * * *